(12) United States Patent
Hviid et al.

(10) Patent No.: US 10,382,854 B2
(45) Date of Patent: *Aug. 13, 2019

(54) NEAR FIELD GESTURE CONTROL SYSTEM AND METHOD

(71) Applicant: BRAGI GmbH, München (DE)

(72) Inventors: Nikolaj Hviid, München (DE); Friedrich Christian Förstner, München (DE); Eric Christian Hirsch, München (DE)

(73) Assignee: BRAGI GmbH, München (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/928,960

(22) Filed: Mar. 22, 2018

(65) Prior Publication Data

US 2018/0220221 A1 Aug. 2, 2018

Related U.S. Application Data

(63) Continuation of application No. 15/244,917, filed on Aug. 23, 2016, now Pat. No. 9,949,013.

(60) Provisional application No. 62/211,728, filed on Aug. 29, 2015.

(51) Int. Cl.
| | |
|---|---|
| *G06F 3/01* | (2006.01) |
| *H04R 1/10* | (2006.01) |
| *G01J 1/16* | (2006.01) |
| *G06F 3/0354* | (2013.01) |

(52) U.S. Cl.
CPC ............ *H04R 1/1041* (2013.01); *G01J 1/16* (2013.01); *G06F 3/017* (2013.01); *G06F 3/03547* (2013.01); *H04R 2430/01* (2013.01)

(58) Field of Classification Search
CPC ... H04R 1/1041; G06F 3/017; G06F 3/03547; G01C 21/005; G01C 21/165; G01C 21/20
See application file for complete search history.

(56) References Cited

U.S. PATENT DOCUMENTS

| | | | |
|---|---|---|---|
| 2,325,590 | A | 8/1943 | Carlisle et al. |
| 2,430,229 | A | 11/1947 | Kelsey |
| 3,047,089 | A | 7/1962 | Zwislocki |
| D208,784 | S | 10/1967 | Sanzone |
| 3,586,794 | A | 6/1971 | Michaelis |
| 3,696,377 | A | 10/1972 | Wall |
| 3,934,100 | A | 1/1976 | Harada |

(Continued)

FOREIGN PATENT DOCUMENTS

| | | |
|---|---|---|
| CN | 204244472 U | 4/2015 |
| CN | 104683519 A | 6/2015 |

(Continued)

OTHER PUBLICATIONS

Stretchgoal—Windows Phone Support (Feb. 17, 2014).

(Continued)

*Primary Examiner* — Amir H Etesam
(74) *Attorney, Agent, or Firm* — Goodhue, Coleman & Owens, P.C.

(57) ABSTRACT

An earpiece includes an earpiece housing, a processor disposed within the earpiece housing, and a gesture based interface operatively connected to the processor and configured to detect changes in an energy field associated with user gestures. The processor is configured to interpret the changes in the energy field to determine the user gestures.

17 Claims, 6 Drawing Sheets

(56) References Cited

U.S. PATENT DOCUMENTS

| | | |
|---|---|---|
| 3,983,336 A | 9/1976 | Malek et al. |
| 4,069,400 A | 1/1978 | Johanson et al. |
| 4,150,262 A | 4/1979 | Ono |
| 4,334,315 A | 6/1982 | Ono et al. |
| D266,271 S | 9/1982 | Johanson et al. |
| 4,375,016 A | 2/1983 | Harada |
| 4,588,867 A | 5/1986 | Konomi |
| 4,617,429 A | 10/1986 | Bellafiore |
| 4,654,883 A | 3/1987 | Iwata |
| 4,682,180 A | 7/1987 | Gans |
| 4,791,673 A | 12/1988 | Schreiber |
| 4,852,177 A | 7/1989 | Ambrose |
| 4,865,044 A | 9/1989 | Wallace et al. |
| 4,984,277 A | 1/1991 | Bisgaard et al. |
| 5,008,943 A | 4/1991 | Arndt et al. |
| 5,185,802 A | 2/1993 | Stanton |
| 5,191,602 A | 3/1993 | Regen et al. |
| 5,201,007 A | 4/1993 | Ward et al. |
| 5,201,008 A | 4/1993 | Arndt et al. |
| D340,286 S | 10/1993 | Seo |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,347,584 A | 9/1994 | Narisawa |
| 5,363,444 A | 11/1994 | Norris |
| 5,444,786 A | 8/1995 | Raviv |
| D367,113 S | 2/1996 | Weeks |
| 5,497,339 A | 3/1996 | Bernard |
| 5,606,621 A | 2/1997 | Reiter et al. |
| 5,613,222 A | 3/1997 | Guenther |
| 5,654,530 A | 8/1997 | Sauer et al. |
| 5,692,059 A | 11/1997 | Kruger |
| 5,721,783 A | 2/1998 | Anderson |
| 5,748,743 A | 5/1998 | Weeks |
| 5,749,072 A | 5/1998 | Mazurkiewicz et al. |
| 5,771,438 A | 6/1998 | Palermo et al. |
| D397,796 S | 9/1998 | Yabe et al. |
| 5,802,167 A | 9/1998 | Hong |
| 5,844,996 A | 12/1998 | Enzmann et al. |
| D410,008 S | 5/1999 | Almqvist |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,084,526 A | 7/2000 | Blotky et al. |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,185,152 B1 | 2/2001 | Shen |
| 6,208,372 B1 | 3/2001 | Barraclough |
| 6,230,029 B1 | 5/2001 | Yegiazaryan et al. |
| 6,275,789 B1 | 8/2001 | Moser et al. |
| 6,339,754 B1 | 1/2002 | Flanagan et al. |
| D455,835 S | 4/2002 | Anderson et al. |
| 6,408,081 B1 | 6/2002 | Boesen |
| 6,424,820 B1 | 7/2002 | Burdick et al. |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,563,301 B2 | 5/2003 | Gventer |
| 6,654,721 B2 | 11/2003 | Handelman |
| 6,664,713 B2 | 12/2003 | Boesen |
| 6,690,807 B1 | 2/2004 | Meyer |
| 6,694,180 B2 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,010,137 B1 | 3/2006 | Leedom et al. |
| 7,113,611 B2 | 9/2006 | Leedom et al. |
| D532,520 S | 11/2006 | Kampmeier et al. |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| D549,222 S | 8/2007 | Huang |
| D554,756 S | 11/2007 | Sjursen et al. |
| 7,403,629 B1 | 7/2008 | Aceti et al. |
| D579,006 S | 10/2008 | Kim et al. |
| 7,463,902 B2 | 12/2008 | Boesen |
| 7,508,411 B2 | 3/2009 | Boesen |
| 7,532,901 B1 | 5/2009 | LaFranchise et al. |
| D601,134 S | 9/2009 | Elabidi et al. |
| 7,825,626 B2 | 11/2010 | Kozisek |
| 7,859,469 B1 | 12/2010 | Rosener et al. |
| 7,965,855 B1 | 6/2011 | Ham |
| 7,979,035 B2 | 7/2011 | Griffin et al. |
| 7,983,628 B2 | 7/2011 | Boesen |
| D647,491 S | 10/2011 | Chen et al. |
| 8,095,188 B2 | 1/2012 | Shi |
| 8,108,143 B1 | 1/2012 | Tester |
| 8,140,357 B1 | 3/2012 | Boesen |
| D666,581 S | 9/2012 | Perez |
| 8,300,864 B2 | 10/2012 | Müllenborn et al. |
| 8,406,448 B2 | 3/2013 | Lin |
| 8,430,817 B1 | 4/2013 | Al-Ali et al. |
| 8,436,780 B2 | 5/2013 | Schantz et al. |
| D687,021 S | 7/2013 | Yuen |
| 8,679,012 B1 | 3/2014 | Kayyali |
| 8,719,877 B2 | 5/2014 | VonDoenhoff et al. |
| 8,774,434 B2 | 7/2014 | Zhao et al. |
| 8,831,266 B1 | 9/2014 | Huang |
| 8,891,800 B1 | 11/2014 | Shaffer |
| 8,994,498 B2 | 3/2015 | Agrafioti et al. |
| D728,107 S | 4/2015 | Martin et al. |
| 9,013,145 B2 | 4/2015 | Castillo et al. |
| 9,037,125 B1 | 5/2015 | Kadous |
| D733,103 S | 6/2015 | Jeong et al. |
| 9,081,944 B2 | 7/2015 | Camacho et al. |
| 9,461,403 B2 | 10/2016 | Gao et al. |
| 9,510,159 B1 | 11/2016 | Cuddihy et al. |
| D773,439 S | 12/2016 | Walker |
| D775,158 S | 12/2016 | Dong et al. |
| D777,710 S | 1/2017 | Palmborg et al. |
| 9,544,689 B2 | 1/2017 | Fisher et al. |
| D788,079 S | 5/2017 | Son et al. |
| 9,711,062 B2 | 7/2017 | Ellis et al. |
| 9,729,979 B2 | 8/2017 | Özden |
| 9,767,709 B2 | 9/2017 | Ellis |
| 9,848,257 B2 | 12/2017 | Ambrose et al. |
| 2001/0005197 A1 | 6/2001 | Mishra et al. |
| 2001/0027121 A1 | 10/2001 | Boesen |
| 2001/0043707 A1 | 11/2001 | Leedom |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |

(56) References Cited

U.S. PATENT DOCUMENTS

| | | |
|---|---|---|
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0102931 A1 | 5/2004 | Ellis et al. |
| 2004/0160511 A1 | 8/2004 | Boesen |
| 2005/0017842 A1 | 1/2005 | Dematteo |
| 2005/0043056 A1 | 2/2005 | Boesen |
| 2005/0094839 A1 | 5/2005 | Gwee |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0197063 A1 | 9/2005 | White |
| 2005/0212911 A1 | 9/2005 | Marvit et al. |
| 2005/0238190 A1* | 10/2005 | Rohrlein .......... H03G 3/04 381/312 |
| 2005/0251455 A1 | 11/2005 | Boesen |
| 2005/0266876 A1 | 12/2005 | Boesen |
| 2006/0029246 A1 | 2/2006 | Boesen |
| 2006/0073787 A1 | 4/2006 | Lair et al. |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0220915 A1 | 10/2006 | Bauer |
| 2006/0258412 A1 | 11/2006 | Liu |
| 2007/0102009 A1 | 5/2007 | Wong et al. |
| 2007/0239225 A1 | 10/2007 | Saringer |
| 2007/0269785 A1 | 11/2007 | Yamanoi |
| 2008/0076972 A1 | 3/2008 | Dorogusker et al. |
| 2008/0090622 A1 | 4/2008 | Kim et al. |
| 2008/0102424 A1 | 5/2008 | Holljes |
| 2008/0146890 A1 | 6/2008 | LeBoeuf et al. |
| 2008/0187163 A1 | 8/2008 | Goldstein et al. |
| 2008/0215239 A1 | 9/2008 | Lee |
| 2008/0253583 A1 | 10/2008 | Goldstein et al. |
| 2008/0254780 A1 | 10/2008 | Kuhl et al. |
| 2008/0255430 A1 | 10/2008 | Alexandersson et al. |
| 2008/0298606 A1 | 12/2008 | Johnson et al. |
| 2009/0003620 A1 | 1/2009 | McKillop et al. |
| 2009/0008275 A1 | 1/2009 | Ferrari et al. |
| 2009/0017881 A1 | 1/2009 | Madrigal |
| 2009/0073070 A1 | 3/2009 | Rofougaran |
| 2009/0097689 A1 | 4/2009 | Prest et al. |
| 2009/0105548 A1 | 4/2009 | Bart |
| 2009/0154739 A1 | 6/2009 | Zellner |
| 2009/0191920 A1 | 7/2009 | Regen et al. |
| 2009/0226017 A1 | 9/2009 | Abolfathi et al. |
| 2009/0245559 A1 | 10/2009 | Boltyenkov et al. |
| 2009/0261114 A1 | 10/2009 | McGuire et al. |
| 2009/0296968 A1 | 12/2009 | Wu et al. |
| 2009/0303073 A1 | 12/2009 | Gilling et al. |
| 2009/0304210 A1 | 12/2009 | Weisman |
| 2010/0033313 A1 | 2/2010 | Keady et al. |
| 2010/0166206 A1 | 7/2010 | Macours |
| 2010/0203831 A1 | 8/2010 | Muth |
| 2010/0210212 A1 | 8/2010 | Sato |
| 2010/0290636 A1 | 11/2010 | Mao et al. |
| 2010/0320961 A1 | 12/2010 | Castillo et al. |
| 2011/0018731 A1 | 1/2011 | Linsky et al. |
| 2011/0103448 A1* | 5/2011 | Dahl .......... G01S 7/5273 375/224 |
| 2011/0103609 A1 | 5/2011 | Pelland et al. |
| 2011/0137141 A1 | 6/2011 | Razoumov et al. |
| 2011/0140844 A1 | 6/2011 | McGuire et al. |
| 2011/0239497 A1 | 10/2011 | McGuire et al. |
| 2011/0286615 A1 | 11/2011 | Olodort et al. |
| 2011/0293105 A1 | 12/2011 | Arie et al. |
| 2012/0057740 A1 | 3/2012 | Rosal |
| 2012/0155670 A1 | 6/2012 | Rutschman |
| 2012/0163626 A1 | 6/2012 | Booij et al. |
| 2012/0197737 A1 | 8/2012 | LeBoeuf et al. |
| 2012/0235883 A1 | 9/2012 | Border et al. |
| 2012/0309453 A1 | 12/2012 | Maguire |
| 2013/0106454 A1 | 5/2013 | Liu et al. |
| 2013/0154826 A1 | 6/2013 | Ratajczyk |
| 2013/0178967 A1 | 7/2013 | Mentz |
| 2013/0204617 A1 | 8/2013 | Kuo et al. |
| 2013/0293494 A1 | 11/2013 | Reshef |
| 2013/0316642 A1 | 11/2013 | Newham |
| 2013/0346168 A1 | 12/2013 | Zhou et al. |
| 2014/0004912 A1 | 1/2014 | Rajakarunanayake |
| 2014/0014697 A1 | 1/2014 | Schmierer et al. |
| 2014/0020089 A1 | 1/2014 | Perini, II |
| 2014/0072136 A1 | 3/2014 | Tenenbaum et al. |
| 2014/0072146 A1 | 3/2014 | Itkin et al. |
| 2014/0073429 A1 | 3/2014 | Meneses et al. |
| 2014/0079257 A1 | 3/2014 | Ruwe et al. |
| 2014/0106677 A1 | 4/2014 | Altman |
| 2014/0122116 A1 | 5/2014 | Smythe |
| 2014/0146973 A1 | 5/2014 | Liu et al. |
| 2014/0153768 A1 | 6/2014 | Hagen et al. |
| 2014/0163771 A1 | 6/2014 | Demeniuk |
| 2014/0185828 A1 | 7/2014 | Helbling |
| 2014/0219467 A1 | 8/2014 | Kurtz |
| 2014/0222462 A1 | 8/2014 | Shakil et al. |
| 2014/0235169 A1 | 8/2014 | Parkinson et al. |
| 2014/0270227 A1 | 9/2014 | Swanson |
| 2014/0270271 A1 | 9/2014 | Dehe et al. |
| 2014/0276227 A1 | 9/2014 | Pérez |
| 2014/0310595 A1 | 10/2014 | Acharya et al. |
| 2014/0321682 A1 | 10/2014 | Kofod-Hansen et al. |
| 2014/0335908 A1 | 11/2014 | Krisch et al. |
| 2014/0348367 A1 | 11/2014 | Vavrus et al. |
| 2015/0028996 A1 | 1/2015 | Agrafioti et al. |
| 2015/0035643 A1 | 2/2015 | Kursun |
| 2015/0036835 A1 | 2/2015 | Chen |
| 2015/0056584 A1 | 2/2015 | Boulware et al. |
| 2015/0110587 A1 | 4/2015 | Hori |
| 2015/0148989 A1 | 5/2015 | Cooper et al. |
| 2015/0181356 A1 | 6/2015 | Krystek et al. |
| 2015/0230022 A1 | 8/2015 | Sakai et al. |
| 2015/0245127 A1 | 8/2015 | Shaffer |
| 2015/0256949 A1 | 9/2015 | Vanpoucke et al. |
| 2015/0264472 A1 | 9/2015 | Aase |
| 2015/0264501 A1 | 9/2015 | Hu et al. |
| 2015/0317565 A1 | 11/2015 | Li et al. |
| 2015/0358751 A1 | 12/2015 | Deng et al. |
| 2015/0359436 A1 | 12/2015 | Shim et al. |
| 2015/0364058 A1 | 12/2015 | Lagree et al. |
| 2015/0373467 A1 | 12/2015 | Gelter |
| 2015/0373474 A1 | 12/2015 | Kraft et al. |
| 2016/0033280 A1 | 2/2016 | Moore et al. |
| 2016/0034249 A1 | 2/2016 | Lee et al. |
| 2016/0071526 A1 | 3/2016 | Wingate et al. |
| 2016/0072558 A1 | 3/2016 | Hirsch et al. |
| 2016/0073189 A1 | 3/2016 | Lindén et al. |
| 2016/0100262 A1 | 4/2016 | Inagaki |
| 2016/0119737 A1 | 4/2016 | Mehnert et al. |
| 2016/0124707 A1 | 5/2016 | Ermilov et al. |
| 2016/0125892 A1 | 5/2016 | Bowen et al. |
| 2016/0140870 A1 | 5/2016 | Connor |
| 2016/0142818 A1 | 5/2016 | Park |
| 2016/0162259 A1 | 6/2016 | Zhao et al. |
| 2016/0209691 A1 | 7/2016 | Yang et al. |
| 2016/0253994 A1 | 9/2016 | Panchapagesan et al. |
| 2016/0324478 A1 | 11/2016 | Goldstein |
| 2016/0353196 A1 | 12/2016 | Baker et al. |
| 2016/0360350 A1 | 12/2016 | Watson et al. |
| 2017/0021257 A1 | 1/2017 | Gilbert et al. |
| 2017/0046503 A1 | 2/2017 | Cho et al. |
| 2017/0059152 A1 | 3/2017 | Hirsch et al. |
| 2017/0060262 A1 | 3/2017 | Hviid et al. |
| 2017/0060269 A1 | 3/2017 | Förstner et al. |
| 2017/0061751 A1 | 3/2017 | Loermann et al. |
| 2017/0061817 A1 | 3/2017 | Mettler May |
| 2017/0062913 A1 | 3/2017 | Hirsch et al. |
| 2017/0064426 A1 | 3/2017 | Hviid |
| 2017/0064428 A1 | 3/2017 | Hirsch |
| 2017/0064432 A1 | 3/2017 | Hviid et al. |
| 2017/0064437 A1 | 3/2017 | Hviid et al. |
| 2017/0078780 A1 | 3/2017 | Qian et al. |
| 2017/0078785 A1 | 3/2017 | Qian et al. |

(56) References Cited

U.S. PATENT DOCUMENTS

| | | |
|---|---|---|
| 2017/0100277 A1 | 4/2017 | Ke |
| 2017/0108918 A1 | 4/2017 | Boesen |
| 2017/0109131 A1 | 4/2017 | Boesen |
| 2017/0110124 A1 | 4/2017 | Boesen et al. |
| 2017/0110899 A1 | 4/2017 | Boesen |
| 2017/0111723 A1 | 4/2017 | Boesen |
| 2017/0111725 A1 | 4/2017 | Boesen et al. |
| 2017/0111726 A1 | 4/2017 | Martin et al. |
| 2017/0111740 A1 | 4/2017 | Hviid et al. |
| 2017/0127168 A1 | 5/2017 | Briggs et al. |
| 2017/0131094 A1 | 5/2017 | Kulik |
| 2017/0142511 A1 | 5/2017 | Dennis |
| 2017/0146801 A1 | 5/2017 | Stempora |
| 2017/0150920 A1 | 6/2017 | Chang et al. |
| 2017/0151085 A1 | 6/2017 | Chang et al. |
| 2017/0151447 A1 | 6/2017 | Boesen |
| 2017/0151668 A1 | 6/2017 | Boesen |
| 2017/0151918 A1 | 6/2017 | Boesen |
| 2017/0151930 A1 | 6/2017 | Boesen |
| 2017/0151957 A1 | 6/2017 | Boesen |
| 2017/0151959 A1 | 6/2017 | Boesen |
| 2017/0153114 A1 | 6/2017 | Boesen |
| 2017/0153636 A1 | 6/2017 | Boesen |
| 2017/0154532 A1 | 6/2017 | Boesen |
| 2017/0155985 A1 | 6/2017 | Boesen |
| 2017/0155992 A1 | 6/2017 | Perianu et al. |
| 2017/0155993 A1 | 6/2017 | Boesen |
| 2017/0155997 A1 | 6/2017 | Boesen |
| 2017/0155998 A1 | 6/2017 | Boesen |
| 2017/0156000 A1 | 6/2017 | Boesen |
| 2017/0164890 A1 | 6/2017 | Leip et al. |
| 2017/0178631 A1 | 6/2017 | Boesen |
| 2017/0180842 A1 | 6/2017 | Boesen |
| 2017/0180843 A1 | 6/2017 | Perianu et al. |
| 2017/0180897 A1 | 6/2017 | Perianu |
| 2017/0188127 A1 | 6/2017 | Perianu et al. |
| 2017/0188132 A1 | 6/2017 | Hirsch et al. |
| 2017/0193978 A1 | 7/2017 | Goldman |
| 2017/0195829 A1 | 7/2017 | Belverato et al. |
| 2017/0208393 A1 | 7/2017 | Boesen |
| 2017/0214987 A1 | 7/2017 | Boesen |
| 2017/0215016 A1 | 7/2017 | Dohmen et al. |
| 2017/0230752 A1 | 8/2017 | Dohmen et al. |
| 2017/0251933 A1 | 9/2017 | Braun et al. |
| 2017/0257698 A1 | 9/2017 | Boesen et al. |
| 2017/0258329 A1 | 9/2017 | Marsh |
| 2017/0263236 A1 | 9/2017 | Boesen et al. |
| 2017/0263376 A1 | 9/2017 | Verschueren et al. |
| 2017/0266494 A1 | 9/2017 | Crankson et al. |
| 2017/0273622 A1 | 9/2017 | Boesen |
| 2017/0280257 A1 | 9/2017 | Gordon et al. |
| 2017/0301337 A1 | 10/2017 | Golani et al. |
| 2017/0361213 A1 | 12/2017 | Goslin et al. |
| 2017/0366233 A1 | 12/2017 | Hviid et al. |
| 2018/0007994 A1 | 1/2018 | Boesen et al. |
| 2018/0008194 A1 | 1/2018 | Boesen |
| 2018/0008198 A1 | 1/2018 | Kingscott |
| 2018/0009447 A1 | 1/2018 | Boesen et al. |
| 2018/0011006 A1 | 1/2018 | Kingscott |
| 2018/0011682 A1 | 1/2018 | Milevski et al. |
| 2018/0011994 A1 | 1/2018 | Boesen |
| 2018/0012228 A1 | 1/2018 | Milevski et al. |
| 2018/0013195 A1 | 1/2018 | Hviid et al. |
| 2018/0014102 A1 | 1/2018 | Hirsch et al. |
| 2018/0014103 A1 | 1/2018 | Martin et al. |
| 2018/0014104 A1 | 1/2018 | Boesen et al. |
| 2018/0014107 A1 | 1/2018 | Razouane et al. |
| 2018/0014108 A1 | 1/2018 | Dragicevic et al. |
| 2018/0014109 A1 | 1/2018 | Boesen |
| 2018/0014113 A1 | 1/2018 | Boesen |
| 2018/0014140 A1 | 1/2018 | Milevski et al. |
| 2018/0014436 A1 | 1/2018 | Milevski |
| 2018/0034951 A1 | 2/2018 | Boesen |
| 2018/0040093 A1 | 2/2018 | Boesen |
| 2018/0042501 A1 | 2/2018 | Adi et al. |

FOREIGN PATENT DOCUMENTS

| | | |
|---|---|---|
| CN | 104837094 A | 8/2015 |
| EP | 1469659 A1 | 10/2004 |
| EP | 1017252 A3 | 5/2006 |
| EP | 2903186 A1 | 8/2015 |
| GB | 2074817 | 4/1981 |
| GB | 2508226 A | 5/2014 |
| JP | 06292195 | 10/1994 |
| WO | 2008103925 A1 | 8/2008 |
| WO | 2008113053 A1 | 9/2008 |
| WO | 2007034371 A3 | 11/2008 |
| WO | 2011001433 A2 | 1/2011 |
| WO | 2012071127 A1 | 5/2012 |
| WO | 2013134956 A1 | 9/2013 |
| WO | 2014046602 A1 | 3/2014 |
| WO | 2014043179 A3 | 7/2014 |
| WO | 2015061633 A2 | 4/2015 |
| WO | 2015110577 A1 | 7/2015 |
| WO | 2015110587 A1 | 7/2015 |
| WO | 2016032990 A1 | 3/2016 |
| WO | 2016187869 A1 | 12/2016 |

OTHER PUBLICATIONS

The Dash + The Charging Case & The BRAGI News (Feb. 21, 2014).

The Dash-A Word From Our Software, Mechanical and Acoustics Team + An Update (Mar. 11, 2014).

Update From BRAGI—$3,000,000—Yipee (Mar. 22, 2014).

Weisiger; "Conjugated Hyperbilirubinemia", Jan. 5, 2016.

Wertzner et al., "Analysis of fundamental frequency, jitter, shimmer and vocal intensity in children with phonological disorders", V. 71, n5, 582-588, Sep./Oct. 2005; Brazilian Journal of Othrhinolaryngology.

Wikipedia, "Gamebook", https://en.wikipedia.org/wiki/Gamebook, Sep. 3, 2017, 5 pages.

Wikipedia, "Kinect", "https://en.wikipedia.org/wiki/Kinect", 18 pages, (Sep. 9, 2017).

Wikipedia, "Wii Balance Board", "https://en.wikipedia.org/wiki/Wii_Balance_Board", 3 pages, (Jul. 20, 2017).

Akkermans, "Acoustic Ear Recognition for Person Identification", Automatic Identification Advanced Technologies, 2005 pp. 219-223.

Alzahrani et al: "A Multi-Channel Opto-Electronic Sensor to Accurately Monitor Heart Rate against Motion Artefact during Exercise", Sensors, vol. 15, No. 10, Oct. 12, 2015, pp. 25681-25702, XPO55334602, DOI: 10.3390/s151025681 the whole document.

Announcing the $3,333,333 Stretch Goal (Feb. 24, 2014).

Ben Coxworth: "Graphene-based ink could enable low-cost, foldable electronics", "Journal of Physical Chemistry Letters", Northwestern University, (May 22, 2013).

Blain: "World's first graphene speaker already superior to Sennheiser MX400", htt://www.gizmag.com/graphene-speaker-beats-sennheiser-mx400/31660, (Apr. 15, 2014).

BMW, "BMW introduces BMW Connected—The personalized digital assistant", "http://bmwblog.com/2016/01/05/bmw-introduces-bmw-connected-the-personalized-digital-assistant", (Jan. 5, 2016).

BRAGI is on Facebook (2014).

BRAGI Update—Arrival of Prototype Chassis Parts—More People—Awesomeness (May 13, 2014).

BRAGI Update—Chinese New Year, Design Verification, Charging Case, More People, Timeline(Mar. 6, 2015).

BRAGI Update—First Sleeves From Prototype Tool—Software Development Kit (Jun. 5, 2014).

BRAGI Update—Let's Get Ready to Rumble, A Lot to Be Done Over Christmas (Dec. 22, 2014).

BRAGI Update—Memories From April—Update on Progress (Sep. 16, 2014).

BRAGI Update—Memories from May—Update on Progress—Sweet (Oct. 13, 2014).

BRAGI Update—Memories From One Month Before Kickstarter—Update on Progress (Jul. 10, 2014).

(56) References Cited

OTHER PUBLICATIONS

BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People @BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing-Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, on Track(May 16, 2015).
BRAGI Update—Beta2 Production and Factory Line(Aug. 20, 2015).
BRAGI Update—Certifications, Production, Ramping Up.
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2015).
BRAGI Update—On Track, Design Verification, How It Works and What's Next(Jul. 15, 2015).
BRAGI Update—On Track, on Track and Gems Overview.
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Healthcare Risk Management Review, "Nuance updates computer-assisted physician documentation solution" (Oct. 20, 2016).
Hoffman, "How to Use Android Beam to Wirelessly Transfer Content Between Devices", (Feb. 22, 2013).
Hoyt et. al., "Lessons Learned from Implementation of Voice Recognition for Documentation in the Military Electronic Health Record System", The American Health Information Management Association (2017).
Hyundai Motor America, "Hyundai Motor Company Introduces a Health + Mobility Concept for Wellness in Mobility", Fountain Valley, Califorma (2017).
International Search Report & Written Opinion, PCT/EP16/70245 (dated Nov. 16, 2016).
International Search Report & Written Opinion, PCT/EP2016/070231 (dated Nov. 18, 2016).
International Search Report & Written Opinion, PCT/EP2016/070247 (dated Nov. 18, 2016).
International Search Report & Written Opinion, PCT/EP2016/07216 (dated Oct. 18, 2016).
International Search Report and Written Opinion, PCT/EP2016/070228 (dated Jan. 9, 2017).
Jain A et al: "Score normalization in multimodal biometric systems", Pattern Recognition, Elsevier, GB, vol. 38, No. 12, Dec. 31, 2005, pp. 2270-2285, XPO27610849, ISSN: 0031-3203.
Last Push Before the Kickstarter Campaign Ends on Monday 4pm CET (Mar. 28, 2014).
Nemanja Paunovic et al, "A methodology for testing complex professional electronic systems", Serbian Journal of Electrical Engineering, vol. 9, No. 1, Feb. 1, 2012, pp. 71-80, XPO55317584, YU.
Nigel Whitfield: "Fake tape detectors, 'from the stands' footie and UGH? Internet of Things in my set-top box"; http://www.theregisterco.uk/2014/09/24/ibc_round_up_object_audio_dlna_iot/ (Sep. 24, 2014).
Nuance, "ING Netherlands Launches Voice Biometrics Payment System in the Mobile Banking App Powered by Nuance", "https://www.nuance.com/about-us/newsroom/press-releases/ing-netherlands-launches-nuance-voice-biometirics.html", 4 pages (Jul. 28, 2015).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for the Dash (Feb. 12, 2014).

\* cited by examiner

NEAR FIELD GESTURE CONTROL SYSTEM AND METHOD

PRIORITY STATEMENT

This application claims priority to U.S. Provisional Patent Application No. 62/211,728, filed Aug. 29, 2015, is a continuation application of U.S. patent application Ser. No. 15/244,917 filed on Aug. 23, 2016, both applications are hereby incorporated by reference in their entirety.

FIELD OF THE INVENTION

The present invention relates to wearable devices such as wireless earpieces. More particularly, but not exclusively, the present invention relates to wearable devices such as wireless earpieces with near field gesture based control.

BACKGROUND OF THE ART

Although various wireless earpieces and wearable devices exist, there has not been widespread adoption due to numerous issues and deficiencies. What is needed is an improved wearable device such as an improved wireless earpiece.

SUMMARY

It is a primary object, feature, or advantage of the present invention to provide a wearable device which provides for detection of a user's gestures.

It is a further object, feature, or advantage to provide an earpiece which detects a user's gestures through an IR LED interface.

It is a still further object, feature, or advantage of the present invention to provide an earpiece which is impervious to water and high IR environments.

Another object, feature, or advantage of the present invention is to receive user gestures in the form of swipes and determine the directionality of the swipe through algorithmic analysis.

Yet another object, feature, or advantage of the present invention is to provide audio feedback to a user based on interactions with an IR LED control system.

A still further object, feature, or advantage of the present invention is to provide the ability to accommodate "white out" IR situations through the use of an algorithmic reversal of a primary input methodology.

Another object, feature, or advantage of the present invention is to provide ultrasound sensor capability as an input control methodology.

Yet another object, feature, or advantage of the present invention is to provide a user interface that is fully functional even in situations where there is no option for visual interaction with the user.

Another object, feature, or advantage of the present invention is to provide for maximum user benefit in situations where input control is minimal due to physical space limitations.

Yet another object, feature, or advantage of the present invention is to provide a user interface which is functional even when the user and device are completely submerged in water, the user is wearing gloves, or the device is being used in areas of extremely bright sunlight or other types of diverse use conditions.

One or more of these and/or other objects, features, or advantages of the present invention will become apparent from the specification and claims that follow. No single embodiment need provide each and every object, feature, or advantage as different embodiments may have different objects, features, or advantages. Therefore, the invention is not to be limited by or to any object, feature, or advantage set forth herein.

According to one aspect, an earpiece includes an earpiece housing, a processor disposed within the earpiece housing, and a gesture based interface operatively connected to the processor and configured to detect changes in an energy field associated with user gestures. The processor is configured to interpret the changes in the energy field to determine the user gestures. The gesture based interface may include one or more IR LEDs and one or more IR receivers. Alternatively, the earpiece may include one or more ultra sound emitters and one or more ultrasound receivers. Alternative types of energy fields such as radar may also be used instead of light or sound. The user gestures may include swipe gestures. The processor may be further configured to determine directionality of the swipe gestures. The user gestures may include tap gestures, holds, or combinations of gestures. The earpiece may further include a speaker operatively connected to the processor and wherein the processor is configured to provide audio feedback to a user through the speaker. Where the energy field is an infrared light field, the processor may be configured to reverse modes when the infrared light field exceeds a threshold. The processor may also be configured to alter the rate of energy emission upon detection of an object within the field. The earpiece housing may be water resistant or impervious to water to allow a user to swim while wearing the earpiece.

According to another aspect, an earpiece is provided. The earpiece includes an earpiece housing, an infrared (IR) light emitting diode (LED) interface operative connected to the earpiece housing, and a processor disposed within the earpiece housing and operatively connected to the infrared (IR) light emitting diode (LED) interface. The IR LED interface may include at least one IR LED and at least one IR receiver. The processor may be configured to detect user gestures based on changes in infrared light. The earpiece may further include a speaker disposed within the earpiece housing which may be operatively connected to the processor and wherein the processor may be configured to provide audio feedback through the speaker. The earpiece may be configured to detect proximity of an object to the IR LED interface and adjust sampling speed based upon detection of the object. The processor may be configured to reverse modes when infrared light levels are above (or below) a threshold.

According to yet another aspect an earpiece is provided. The earpiece includes an earpiece housing, an ultrasound interface operatively connected to the earpiece housing, and a processor disposed within the earpiece housing and operatively connected to the ultrasound interface. The ultrasound interface may include at least one ultrasound emitter and at least one ultrasound detector. The processor may be configured to detect user gestures based on changes in ultrasound energy. The earpiece may further include a speaker disposed within the earpiece housing and operatively connected to the processor and wherein the processor is configured to provide audio feedback through the speaker. The processor may be configured to detect proximity of an object to the ultrasound interface and adjust sampling speed based upon detection of the object.

According to another aspect an earpiece is provided. The earpiece includes an earpiece housing, a radar interface operatively connected to the earpiece housing, and a processor disposed within the earpiece housing and operatively connected to the radar interface. The radar interface may include at least one radar emitter and at least one radar detector. The processor may be configured to detect user gestures based on changes in radar energy. The earpiece may further include a speaker disposed within the earpiece housing and operatively connected to the processor and wherein the processor is configured to provide audio feedback through the speaker. The processor may be configured to detect proximity of an object to the radar interface and adjust sampling speed based upon detection of the object.

According to another aspect a wearable device is provided. The wearable device includes a wearable device housing, an infrared (IR) light emitting diode (LED) interface operatively connected to the wearable device housing, and a processor disposed within the wearable device housing and operatively connected to the infrared (IR) light emitting diode (LED) interface. The processor is configured to interpret user gestures.

According to another aspect, a method for interacting with a user of a wearable device is provided. The method includes generating an energy field and detecting changes in the energy field associated with interactions of the user of the wearable device with the energy field. The interactions of the user of the wearable device with the energy field may be user gestures. The energy field may be an infrared light field. The method may further include providing audio feedback to the user of the wearable device. The wearable device may be an earpiece.

According to another aspect, an earpiece includes an earpiece housing, at least one speaker and at least one microphone operatively connected to the earpiece housing, an infrared (IR) light emitting diode (LED) interface operatively connected to the earpiece housing, and a processor disposed within the earpiece housing and operatively connected to the infrared (IR) light emitting diode (LED) interface. The IR LED interface comprises at least one IR LED and at least one IR receiver. The processor is configured to detect user gestures based on changes in infrared light. The processor is configured to detect proximity of an object to the IR LED interface and adjust sampling speed based upon detection of the object. The processor is configured to reverse modes when infrared light is above a threshold.

DETAILED DESCRIPTION

Figure 1:
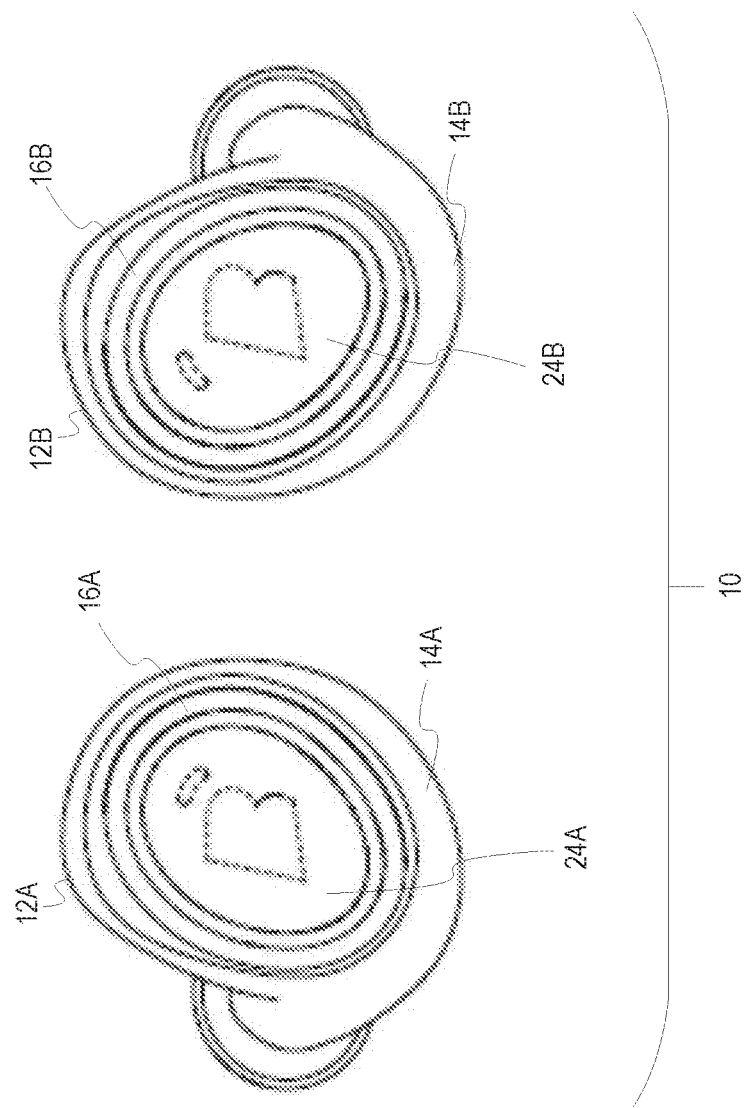
FIG. 1 illustrates a set of earpieces with a gesture based interface.

FIG. 1 illustrates one example of a wearable device in the form of a set of earpieces 10 including a left ear piece 12A and a right earpiece 12B. Each of the ear pieces 12A, 12B has an ear piece housing 14A, 14B which may be in the form of a protective shell or casing. A light display area 16A, 16B is present on each of the ear pieces 12A, 12B. The light generation areas 16A, 16B each provide for producing light of one or more colors.

The wearable device may provide for a plurality of different modes of operation. One mode of operation of the device relate to gestural movements. For example, where a user performs a gestural movement which is interpreted by the device the device may light or activate one or more lighting elements to confirm the gestural movement or to indicate that the gestural movement could not be interpreted. In addition, audio feedback may be used to confirm a gestural movement or to indicate that the gestural movement could not be interpreted. One or more detectors or receivers 24A, 24B may also be present to detect changes in energy fields associated with gestures performed by a user. The receivers 24A, 24B in combination with one or more emitters provide a gesture based user interface.

Figure 2:
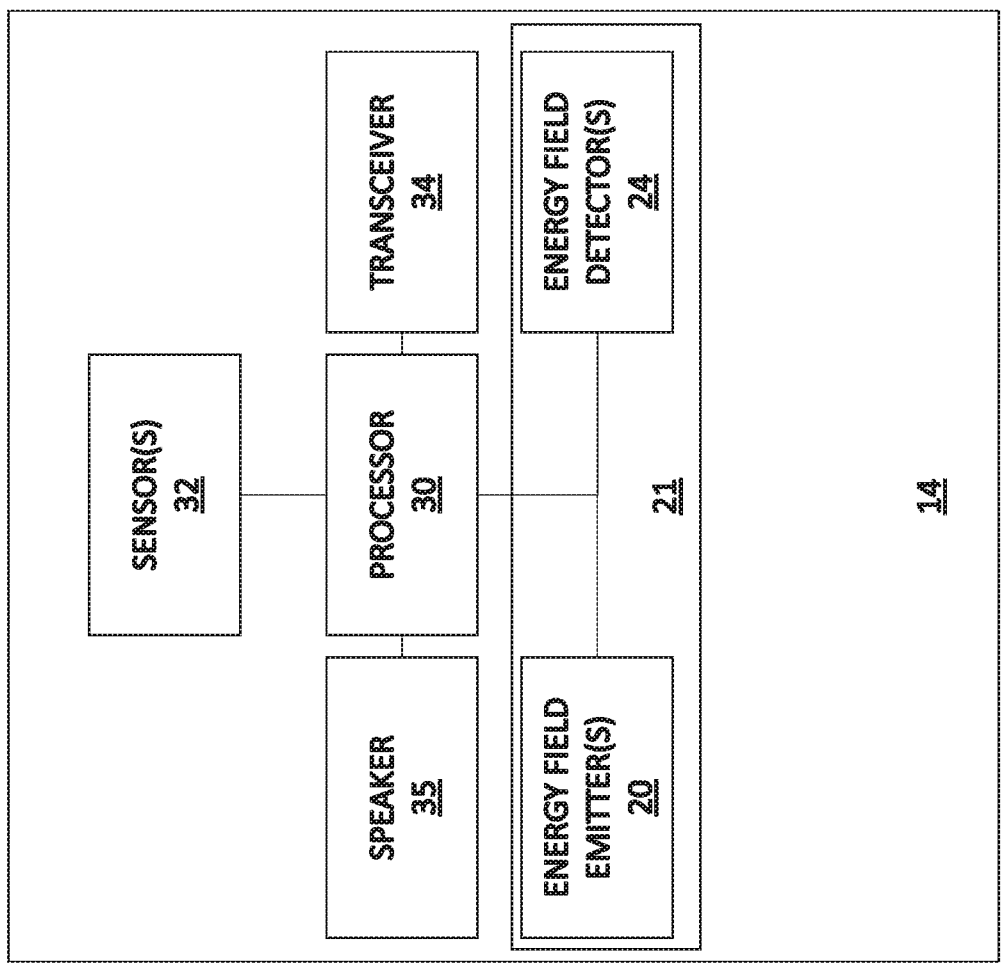
FIG. 2 is a block diagram illustrating a wearable device with a gesture based interface.

FIG. 2 is a block diagram illustrating a device with a housing 14. The device may include a gesture based user interface including one or more energy field emitters and one or more energy field detectors. One or more energy field emitters 20 (such as IR LEDs, other type of light emitters, ultrasound emitters, or other types of sound emitters, or other energy field emitters) may be used. The energy field emitters are operatively connected to the processor 30. It should be understood that interconnecting logic and circuits is not shown. It is to be further understood that the processor shown may include a plurality of different processors or additional circuitry. The processor 30 may also be operatively connected to one or more energy field detectors 24. The energy field detectors may be light detectors, sound detectors or other types of detectors or receivers and not capacitive sensors. For example, wherein the energy field emitters 20 are IR LEDs, the energy field detectors 24 may be IR receivers. The processor 30 may also be electrically connected to one or more sensors 32 (such as, but not limited to an inertial sensor, one or more contact sensors, a bone conduction sensor, one or more microphones, a pulse oximeter, or other biological sensors) and a transceiver 34 such as a short range transceiver using Bluetooth, UWB, magnetic induction, or other means of communication. The processor 30 may also be operatively connected to one or more speakers 35. In operation, the processor 30 may be programed to receive different information using a gesture based user interface including the energy field emitter(s) 20 and the energy field detector(s) 24 based on context or mode of operation of the device. One way in which the processor 30 may determine the relevant mode of operation of the device is from data collected from one or more of the sensor(s) 32. For example, where the device is an earpiece, the sensor(s) may include an inertial sensor, one or more contact sensors, a bone conduction sensor, one or more microphones, a pulse oximeter, or other biological sensors. Thus, based on the status of different sensors, additional information about the mode of operation and the context of input from a user using the gesture based user interface can be determined.

The wearable device may be a wireless earpiece designed to fit into the external ear and concha cavum segment of the pinna. The system may be responsive in a number of harsh environments. These vary from complete submersion in water to being able to be accessed while wearing gloves, among others. Note that capacitive touch sensors would not be appropriate for these types of use cases.

The wearable device provides a near field control system. Such a system is responsive to the user in multiple environments where current technology physiologic interfaces are incapable of function. Said environments include, but are not limited to situations where the user and device are completely submerged in water, while wearing gloves, in areas of extremely bright sunlight among others. This system may function with no screen for visual feedback expected or anticipated. A gesture based control system may integrate audio signals for transmission of feedback to the individual. Audio based feedback provides a reliable and efficient human/device interface. Such a system requires no tactile feedback.

Figure 3:
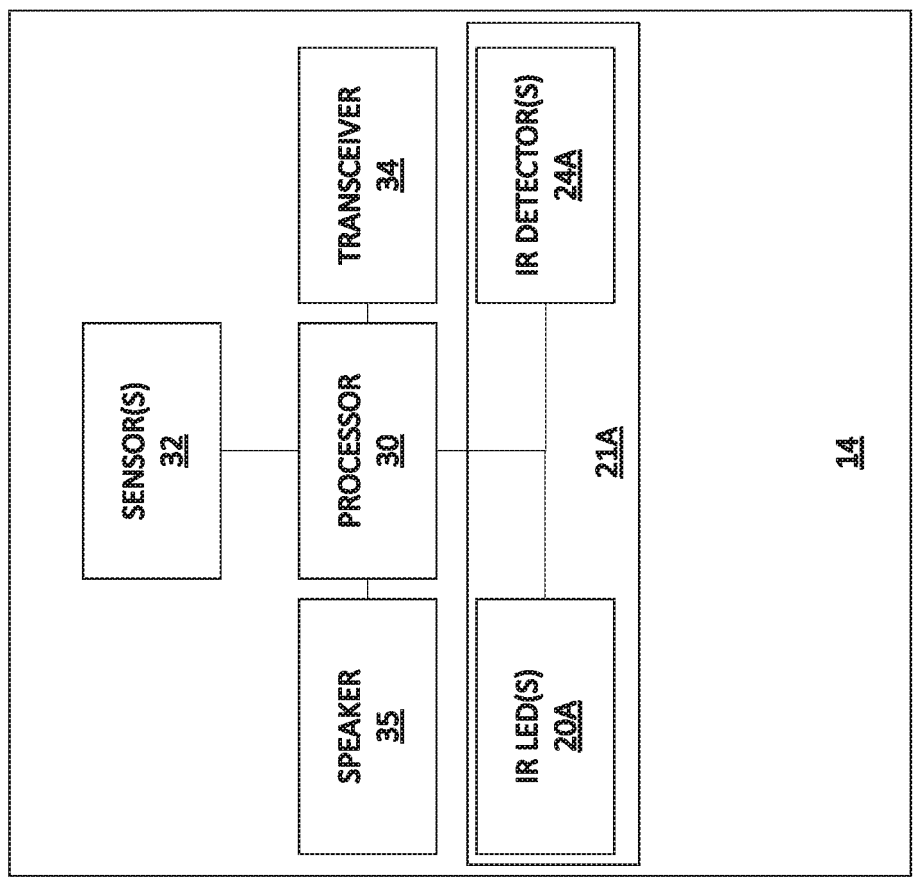
FIG. 3 is a block diagram illustrating a wearable device with an IR LED gesture based interface.

This can be accomplished in a number of ways. As shown in FIG. 3, one embodiment utilizes an optical sensor chip as the detector 24A with associated LEDs 20A as a part of an IR LED interface 21A. These LEDs 20A are spatially segregated. The LEDs 20A are designed so that the user reflects some of the emitted light back to the sensor. If the user gets near the range of the IR, then an action is triggered. In order to allow for precise identification of signal vs. artifact, the preferred embodiment sets the IR emission at a slow rate, e.g. 100 ms intervals. When an object comes within the range of the light emitted, this then triggers an algorithm control for proximity detection. If an object is within the proximity of the one or more LED emitters, the algorithm directs the IR LED emitters to adopt a high sample rate e.g. 4 ms intervals. Reflection patterns can then be read correctly identified as user gestures. The peak proximity at the LED emitter determines the directionality of the swipe, when more than one LED emitter is used. This also allows for more sophisticated levels of user/device interactions such as holds, double taps or combinations of gestures. The system is also able to deactivate the LED emitters if there is a constant lack of feedback signal, such as when the user is wearing a helmet, hat or earmuffs.

Alternately, the system may be designed so that if placed in a position where there is extreme IR exposure, the converse of the previously described methodology is employed. For example, in a situation such as this, where there is massive IR exposure (such as at a beach or walking on a sunny day through snow), the finger creates a shadow; this is able to be interpreted correctly as opposite input relative to the baseline.

Alternately, the system may be further designed so that use of other sensors may be brought into usage to further clarify and quantify the data presented to the intelligent control. For example, inertial sensor data can be used to further improve the resolution and accuracy of the reading. Such additional features and benefits are not to be limited to the present examples cited.

Figure 4:
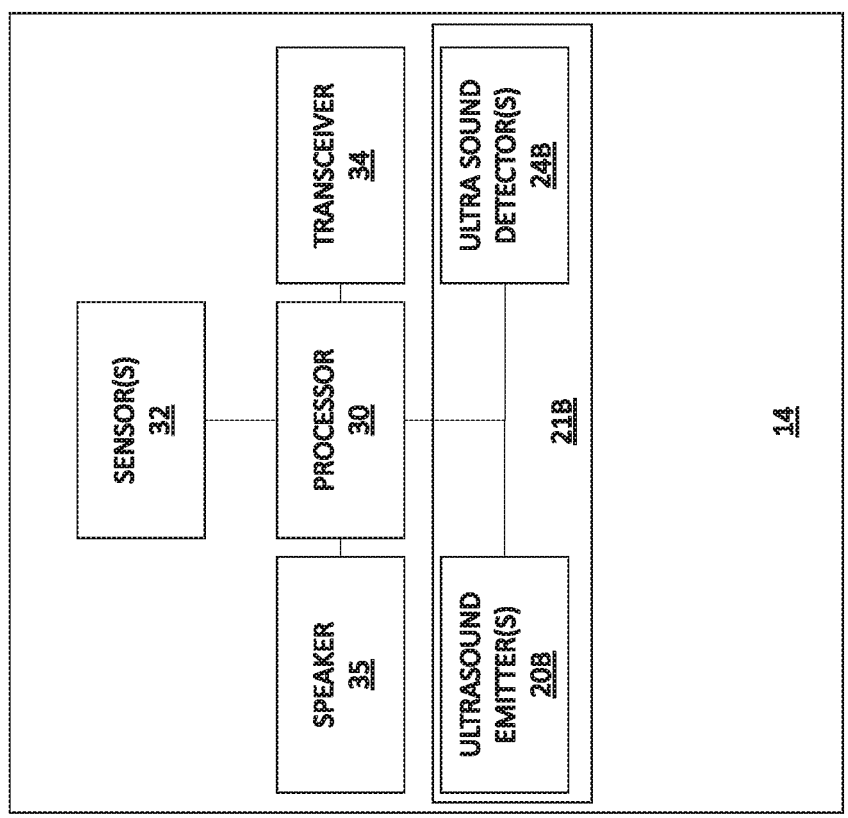
FIG. 4 is a block diagram illustrating a wearable device with an ultrasound gesture based interface.
Figure 5:
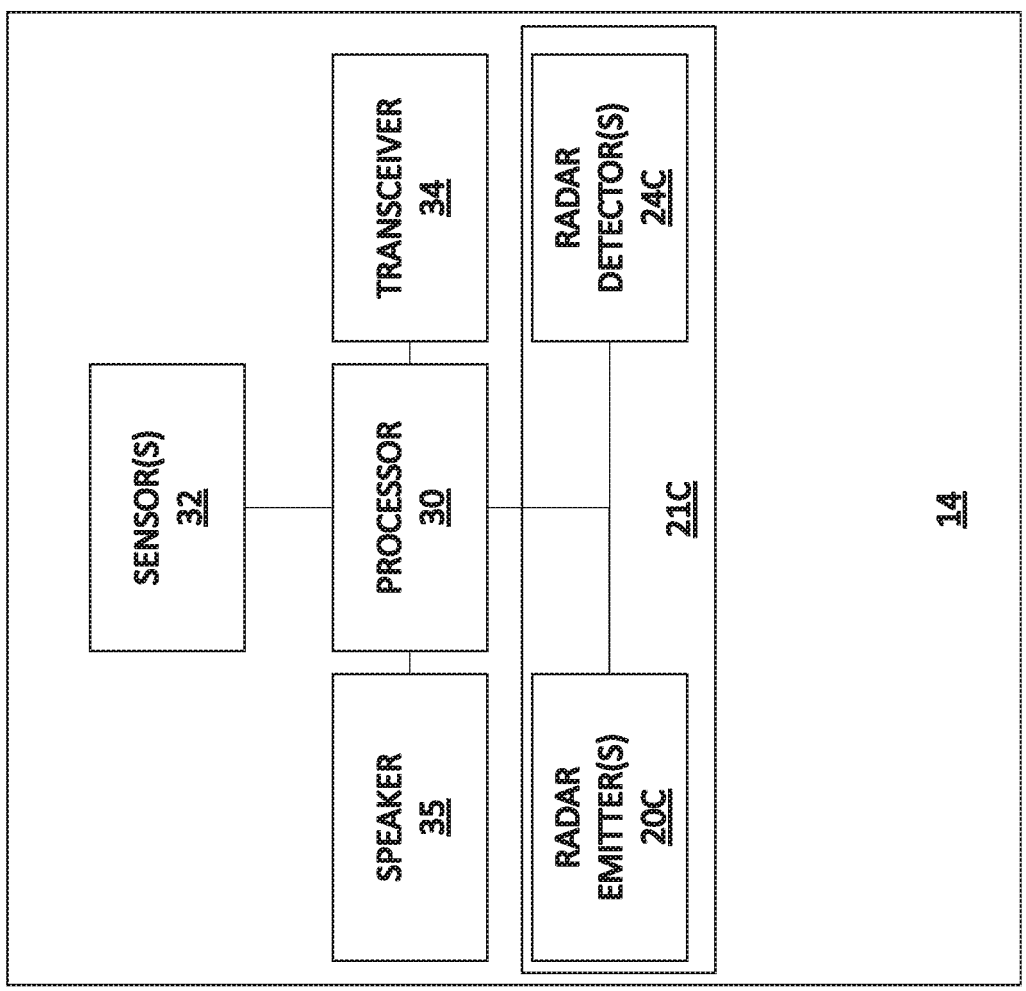
FIG. 5 is a block diagram illustrating a wearable device with a radar gesture based interface.

The system has alternately been constructed using one or more ultrasound sensors, creating a sound wave field in place of the infrared field. As shown in FIG. 4 the interface 21B is an ultrasound interface with ultrasound emitter(s) 20B and ultrasound detector(s) 24B. Therefore, the energy field which is changed due to interactions with the user need not be comprised of light but may also be associated with sound or other types of energy. FIG. 5 illustrates yet another example where the interface 21C is a radar interface with radar emitters 20C and radar detector(s) 24C.

In operation, a user may wear the ear piece. The user may make a gesture near the IR LED interface (or other type of interface). The gesture may be in the form of a tap, a double tap, a triple tap, a swipe (such as a swipe with a particular directionality), a hold, or other gesture. Note that different functionalities may be associated with different gestures and different functionalities may be associated with the same gesture when the device is operating in different modes of operation. Although it is generally preferred that gestures be simple, it is contemplated that complex gestures may be used based on a combination of simple gestures. It is further contemplated that the ear piece may be trained to identify swipes or taps from different fingers of a user. It is further contemplated that swipes or taps of different durations may be interpreted differently. In addition, directionality of user gestures may be used to define the gestures.

It is also contemplated that more than one wearable device may be used. For example, two earpieces may be used each with its own user interface. Where multiple devices are used, it is to be understood that the same gesture performed at one device may be associated with one function while the same gesture performed at the other device may associated with a different function. Alternatively, the same gesture may perform the same function regardless of which device the gesture is performed at.

Figure 6:
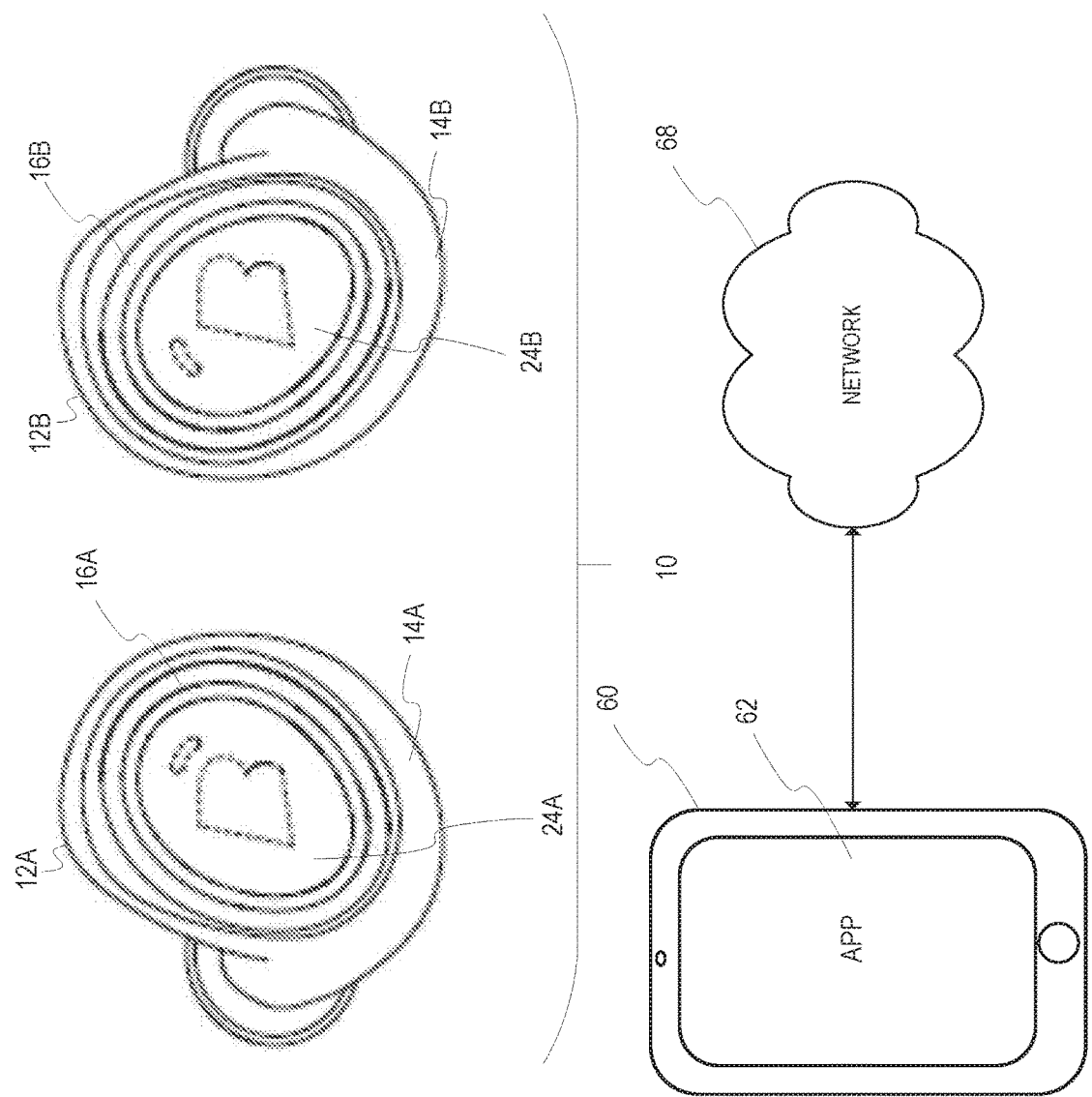
FIG. 6 illustrates a mobile app in communication with wearable devices having gesture based interfaces.

It is further contemplated that audio feedback may be provided to the user in response to gestures made. For example, the audio feedback may simply indicate that the gesture was received or may specify the functionality associated with the gesture. Alternatively, the audio feedback may request additional gestures such as an additional gesture to confirm the gesture previously made or that the function associated with the gesture is to be performed. It is contemplated that whether audio feedback is used or not and/or the type of audio feedback used may be controlled through user settings of the device. For example audio feedback may always be used, or audio feedback may only be used where the confidence level associated with identifying the gesture is not sufficiently high enough, or audio feedback may only be used in certain modes of operation. As shown in FIG. 6, user settings may be changed through the device or through other devices in operative communication with the device such as through a mobile application 62 operating on a mobile device 60 in wireless communication with one or more wearable devices 12A, 12B, each having a gesture-based user interface.

Note that the user interface provides a number of advantages which may be of particular importance. For example, where the device is an ear piece, the ear piece may be resistant or impervious to water. Thus, for example, a user may wear the earpiece while swimming. In such a situation other types of user interfaces such as capacitive touch may not be appropriate. In addition, because as previously explained, when there is massive IR exposure the use of IR may be reversed, the user interface may be used even in high IR environments.

One of the other significant advantages that the gesture based user interface provides is that a user may fully interact with the system even in situations where there is no option for visual interaction with the user. Another significant advantage is that the user interface may be used in situations where input control is minimal due to physical space limitations. A further benefit of the user interface is that voice commands are not required and thus issues associated with voice control can be avoided.

Therefore, various apparatus, systems, and methods have been shown and described. Differences in the type of energy detection, the algorithms used, the gestures used, and other options, variations, and alternatives are contemplated.

What is claimed is:

1. A method for near field gesture based control of an earpiece the method comprising:
emitting pulses at a first sampling rate from at least one emitter of the earpiece;

sensing the pulses reflected off a user of the earpiece, the sensing performed by at least one detector of the earpiece;

increasing from the first sampling rate to a second sampling rate higher than the first sampling rate, the pulses from the at least one emitter if proximity of the user relative to the at least one emitter is above a first threshold;

determining by a processor of the earpiece an occurrence of a gesture performed by the user of the earpiece based on the pulses reflected off the user as detected by the at least one detector during performance of the gesture.

2. The method of claim 1 wherein the at least one emitter is an optical emitter and wherein the at least one detector is an optical detector.

3. The method of claim 1 wherein the at least one emitter comprises at least one infrared (IR) light emitting diode (LED).

4. The method of claim 1 wherein the at least one emitter comprises at least two infrared (IR) light emitting diodes (LEDs).

5. The method of claim 4 wherein the detector comprises at least one IR receiver.

6. The method of claim 1 wherein the at least one emitter comprises at least one ultra sound emitter.

7. The method of claim 1 wherein the at least one emitter comprises a plurality of ultra sound emitters.

8. The method of claim 1 wherein the user gesture is a swipe gesture.

9. The method of claim 8 wherein the processor of the earpiece is configured to determine a directionality of the swipe gesture from a peak proximity of the user gesture.

10. The method of claim 8 wherein the earpiece further comprises a speaker operatively connected to the processor and wherein the processor is further configured to provide audio feedback to a user through the speaker if a confidence level associated with the peak proximity of the swipe gesture is below a second threshold.

11. The method of claim 10 where the audio feedback further comprises an additional request associated with the swipe gesture.

12. The method of claim 1 wherein the processor is further configured to reverse modes when the pulses sensed by the detector exceed a threshold.

13. The method of claim 1 wherein the processor is configured to alter a rate of energy emission upon detection of an object.

14. The method of claim 1 wherein the earpiece housing is water impervious to allow a user to swim while wearing the earpiece.

15. The method of claim 1 wherein the at least one emitter comprises a plurality of radar emitters.

16. The method of claim 1, wherein the detector further comprises at least one radar receiver.

17. The method of claim 1 wherein the user gesture is a tap gesture.

* * * * *